(12) United States Patent
Chipman et al.

(10) Patent No.: US 9,632,986 B2
(45) Date of Patent: Apr. 25, 2017

(54) SYSTEMS AND METHODS FOR HORIZONTALLY PAGINATING HTML CONTENT

(71) Applicant: AOL Inc., Dulles, VA (US)

(72) Inventors: Steven G. Chipman, Ashburn, VA (US); J. Scott Tury, Annandale, VA (US)

(73) Assignee: AOL Inc., Dulles, VA (US)

( * ) Notice: Subject to any disclaimer, the term of this patent is extended or adjusted under 35 U.S.C. 154(b) by 358 days.

(21) Appl. No.: 13/826,306

(22) Filed: Mar. 14, 2013

(65) Prior Publication Data

US 2014/0281924 A1    Sep. 18, 2014

(51) Int. Cl.
G06F 17/00    (2006.01)
G06F 17/21    (2006.01)
G06F 17/30    (2006.01)

(52) U.S. Cl.
CPC ...... *G06F 17/217* (2013.01); *G06F 17/30905* (2013.01)

(58) Field of Classification Search
CPC .................................................. G06F 17/217
See application file for complete search history.

(56) References Cited

U.S. PATENT DOCUMENTS

| | | | |
|---|---|---|---|
| 6,374,273 B1 | 4/2002 | Webster | |
| 2001/0011364 A1* | 8/2001 | Stoub | 717/1 |
| 2002/0073074 A1* | 6/2002 | Sweet | G06F 17/21 |
| 2013/0057876 A1* | 3/2013 | Aoki | 358/1.2 |
| 2013/0117349 A1* | 5/2013 | Burnette et al. | 709/202 |
| 2013/0227398 A1* | 8/2013 | Bolstad | G06F 17/212 |
| | | | 715/236 |

OTHER PUBLICATIONS

International Search Report issued in corresponding International Application No. PCT/US2014/026255, mailed Jun. 16, 2014.
Mirza, Irfan: "CSS3 Columns and Paged Reflowable Content," Apr. 9, 2013, retrieved from www.sitepoint.com/css3-columns-and-paged-reflowable-content/ on Jun. 4, 2014.

(Continued)

*Primary Examiner* — Keith Bloomquist
(74) *Attorney, Agent, or Firm* — Bookoff McAndrews, PLLC

(57) ABSTRACT

Systems and methods are disclosed for horizontally paginating HTML content. One method includes receiving, at a web browser of a device and over a network, HTML content of dynamic or previously unknown length; and populating an article element with the received HTML content. The method also includes setting a width of the article element to a width of the web browser; setting a column width of the article element to the width of the web browser; and splitting the HTML content into a plurality of pages based on the width of the web browser. The method also includes calculating a number of the plurality of pages based on a scroll width of the article element and the width of the web browser; and displaying a user element and at least one of the plurality of pages based on the calculated number of the plurality of pages.

19 Claims, 11 Drawing Sheets

(56) References Cited

OTHER PUBLICATIONS

Daly, Liza: "CSS columns for ebook text | Safari blog," Mar. 8, 2010, retrieved from http://blog.safaribooksonline.com/2010/03/08/css-columns-for-ebook-text; on Jun. 4, 2014.

Håkon, Wium Lie, "Opera Reader: Paging the Web," Oct. 19, 2011, retrieved from http://people.opera.com/howcome/2011/reader/ on Jun. 4, 2014.

Håkon, Wium Lie, "CSS Multi-column Layout Module—W3C Candidate Recommendation Apr. 12, 2011," Apr. 12, 2011, retrieved from www.w3.org/TR/2011/CR-css3-multicol-20110412/ on Jun. 5, 2014.

International Preliminary Report on Patentability issued on Sep. 15, 2015, in corresponding International PCT Application No. PCT/FR2014/US2014/026255, filed on Mar. 13, 2014 (8 pages).

\* cited by examiner

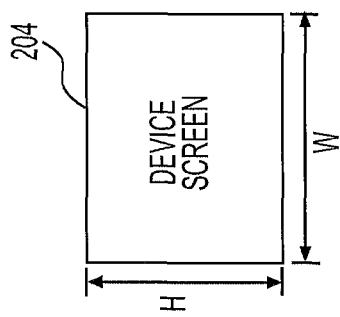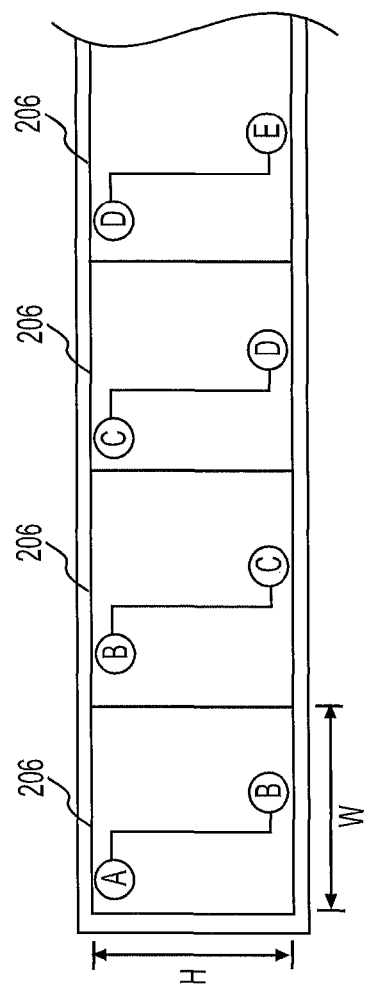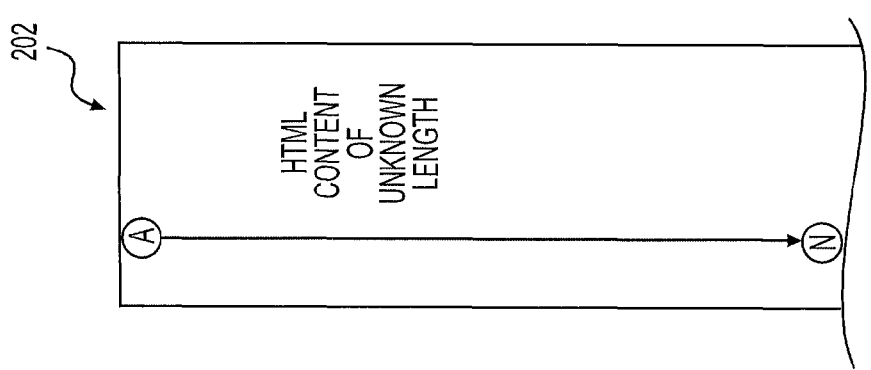

SYSTEMS AND METHODS FOR HORIZONTALLY PAGINATING HTML CONTENT

TECHNICAL FIELD

Various embodiments of the present disclosure relate generally to manipulating and displaying electronic content. More specifically, exemplary embodiments of the present disclosure relate to systems and methods for horizontally paginating HTML content.

BACKGROUND

Articles, stories, and other textual content are increasingly disseminated over the Internet. Such electronic content is typically displayed in a "page layout" or "portrait" orientation. That is, text is often displayed on a screen in a layout consistent with the general shape of a traditional sheet of paper (e.g., 8.5"×11"), or book or magazine page. When such electronic content is displayed on a computer monitor, it is typically allowed to extend downward in an indefinitely long page, and viewers are provided with scroll bars, arrows, scroll wheels, or any other well-known user elements for advancing down a page, by showing the page as moving upward. Even if an article of electronic content has an unknown length, traditional browsers are equipped with mechanisms for adjusting scroll bars, etc. to accommodate any length of electronic content.

Some web browsers are also equipped for handling changing amounts and lengths of electronic content. For example, online publishers are increasingly making use of really simple syndication ("RSS") feeds, which are a web feed format for dynamically publishing HTML content. Browsers equipped with RSS readers or extensions may automatically receive and adjust a displayed amount of HTML content based on the content that an RSS feed is subscribed to, and a frequency of publication.

Recently, however, electronic content is increasingly disseminated over mobile devices. For example, people are increasingly using smartphones, tablets, and other handheld or wearable devices to view web content, including articles, stories, and even RSS feeds. However, many of these smartphones and other mobile devices make use of user interfaces not found on traditional desktop and laptop computers. For example, many smartphones and other mobile devices include touchscreens that can be touched, swiped, dragged, and so on, to manipulate images and user elements displayed on their screens. One common interface allows a user to swipe displayed content upward to intuitively "scroll down" a displayed page. However, when a user rotates such a device from a portrait or page view, to a landscape orientation, many users find it more natural to "swipe" displayed content side-to-side to simulate turning pages in a book, as opposed to scrolling down a portrait-oriented screen.

Displaying textual content in pages that can be swiped from left to right is more challenging than displaying textual content in a continuous page that can be scrolled up and down, because the content is discretized into pages. Existing implementations of such a user interface pattern involve breaking HTML content into discreet chunks, which is even more challenging in applications where content is not fully known, such as an RSS feed or dynamic article. Adding to the challenge of displaying unknown length content in discreet, swipeable pages is the fact that user devices all have different sizes, aspect ratios, margins, and so on.

Accordingly, a need exists for systems and methods for manipulating electronic content. More generally, a need exists for systems and methods for horizontally paginating HTML content, such as by dividing an arbitrary amount of HTML content into separate "pages", regardless of a device's screen size or orientation.

SUMMARY OF THE DISCLOSURE

According to certain embodiments, methods are disclosed for horizontally paginating HTML content. A method includes receiving, at a web browser of a device and over a network, HTML content of dynamic or unknown length; and populating an article element with the received HTML content. The method also includes setting a width of the article element to a width of the web browser; setting a column width of the article element to the width of the web browser; and splitting the HTML content into a plurality of pages based on the width of the web browser. The method also includes calculating a number of the plurality of pages based on a scroll width of the article element and the width of the web browser; and displaying a user element and at least one of the plurality of pages based on the calculated number of the plurality of pages.

According to certain embodiments, devices are disclosed for horizontally paginating HTML content. One device includes a data storage device storing instructions for horizontally paginating HTML content; a processor configured to execute the instructions to perform a method for horizontally paginating HTML content; and a display device configured to display the generated display of the at least one of the plurality pages and the user element. The processor method includes: receiving, at a web browser of a device and over a network, HTML content of dynamic or unknown length; populating an article element with the received HTML content; setting a width of the article element to a width of the web browser; setting a column width of the article element to the width of the web browser; splitting the HTML content into a plurality of pages based on the width of the web browser; calculating a number of the plurality of pages based on a scroll width of the article element and the width of the web browser; and generating a display of a user element and at least one of the plurality of pages based on the calculated number of the plurality of pages; and According to certain embodiments, a computer readable medium is disclosed for storing instructions that, when executed by a computer, cause the computer to perform a method of horizontally paginating HTML content. The method includes populating an article element with the HTML content received at a web browser of a device and over a network; setting a width of the article element to a width of the web browser; setting a column width of the article element to the width of the web browser; and splitting the HTML content into a plurality of pages based on the width of the web browser. The method also includes calculating a number of the plurality of pages based on a scroll width of the article element and the width of the web browser; and generating a display of a user element and at least one of the plurality of pages based on the calculated number of the plurality of pages.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIGS. 2A-2C are schematic diagrams of a technique for horizontally paginating HTML content, according to an exemplary embodiment of the present disclosure;

DESCRIPTION OF THE EMBODIMENTS

Reference will now be made in detail to the exemplary embodiments of the disclosure, examples of which are illustrated in the accompanying drawings. Wherever possible, the same reference numbers will be used throughout the drawings to refer to the same or like parts.

The present disclosure describes systems and methods for horizontally paginating web content. In one embodiment, an HTML5, CSS3, and/or Javascript library is disclosed for paginating a segment of HTML content based on the width and height of the device screen for use within a native application or web page. In one embodiment, the presently disclosed systems and methods may implement this horizontal user interface (UI) pattern independent of the length of the content (e.g., even if it is changing) and independent of traditionally used special formatting techniques, such as the use of wrapped HTML content.

In one embodiment, an exemplary disclosed method may include receiving HTML content of arbitrary length, for populating an article element. The method may further include, e.g., using JavaScript, setting the article element's width and height to that of the web view or browser, and, e.g., using cascading style sheets ("CSS"), setting the column-width of the article element to the width of the device screen. Finally, the number of pages of HTML content may be determined by dividing the scroll width of the article element by the actual width of the article element (e.g., the device's screen width). In one embodiment, user interface indicators may be created and swipe events may be hooked to allow for user navigation through the content.

In one embodiment, HTML pagination may be dynamic, and update accordingly on device orientation change. In addition, the library may be configured to place the user as close as possible to where they were within the content when the screen dimensions changed from a screen reorientation. In one embodiment, the presently disclosed systems and methods may be integrated with a mobile application that ingests an RSS feed, and displays the content from the RSS feed in a paginated view.

Figure 1:
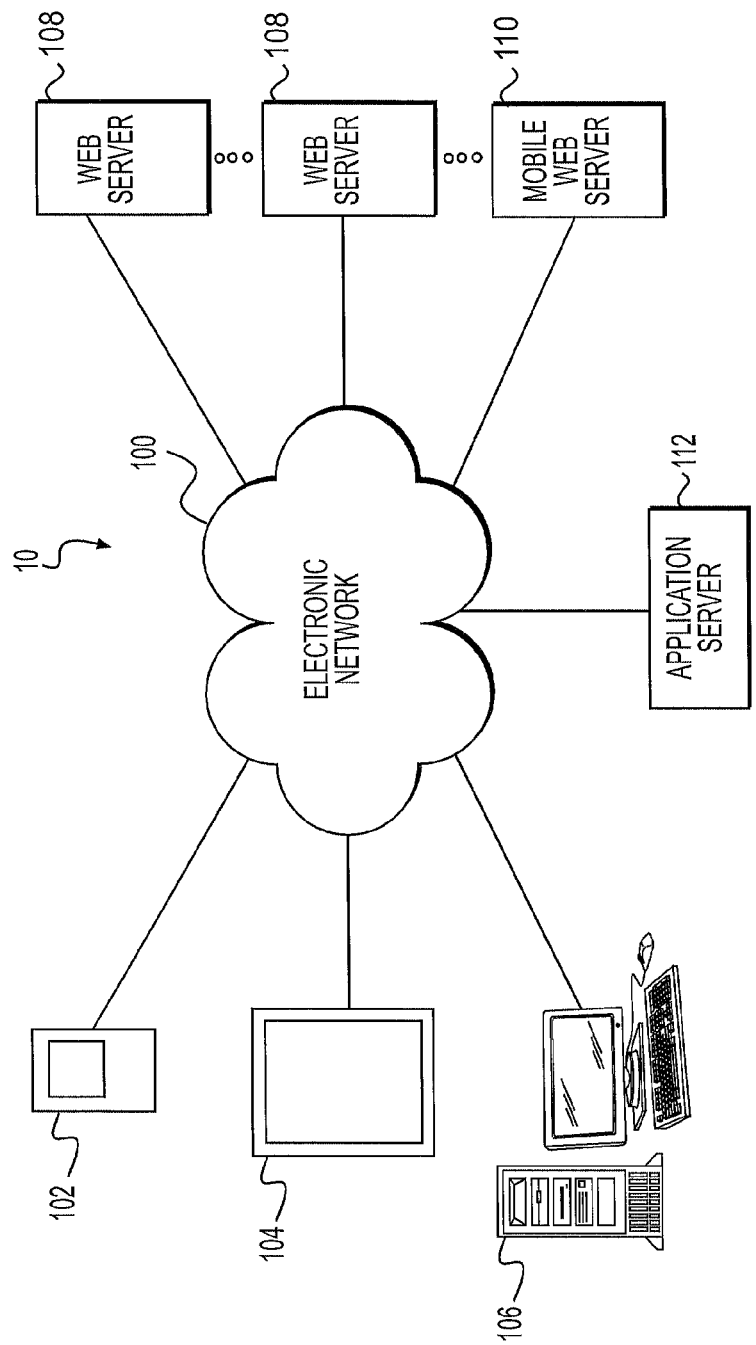
FIG. 1 is a schematic diagram of an environment in which electronic content may be manipulated, according to an exemplary embodiment of the present disclosure.

FIG. 1 is a schematic diagram of an environment 10 in which electronic content may be manipulated, according to an exemplary embodiment of the present disclosure. Specifically, FIG. 1 illustrates an exemplary environment 10 including a plurality of user devices 102, 104, 106, a plurality of web servers 108, 110, and an application server 112, all disposed in communication with an electronic network 100, such as the Internet.

In one embodiment, user devices 102, 104, 106 may be owned and used by one or more people, who may be viewers of web pages over the Internet, either through a mobile browser or web browser stored on respective user devices. User devices 102, 104, 106 may include any type of electronic device configured to send and receive data, such as websites, content, and electronic advertisements, over electronic network 100. For example, each of user devices 102 may include a mobile device, smartphone, and/or personal digital assistant ("PDA") disposed in communication with electronic network 100. Each of user devices 104 may be a tablet computer or any other kind of touchscreen-enabled device disposed in communication with electronic network 100. For example, in one embodiment, each of user devices 102, 104 may be a handheld device, such as an Apple iPhone, Apple iPad, Samsung Galaxy, Amazon Kindle, Microsoft Surface, or any other equivalent or similar device. Each of user devices 106 may be a personal computer, laptop, and/or server disposed in communication with electronic network 100. Each of user devices 102, 104, 106 may have a web browser and/or mobile browser installed for receiving and displaying electronic content received from one or more of web servers 108, 110. Each of user devices 102, 104, 106 may have an operating system configured to execute a web or mobile browser, and any type of application, such as a mobile application. In one embodiment, user devices 102, 104, 106 may be configured to download applications and/or application content from application server 112. In one embodiment, user devices 102, 104, 106 may be configured to download one or more applications from application server 112, and execute those one or more applications to receive electronic content from one or more of web servers 108, 110.

Web servers 108, 110 may be owned and/or operated by any entities that publish online or electronic content. For example, web servers 108, 110 may be operated by publishers, such as online content providers, search engines, e-mail programs, RSS feed providers, magazines, e-zines, blogs, or any other online site or program that distributes online content. Thus, publishers may interact with user devices 102, 104, 106, DNS servers, ad servers, content distribution network servers, or any other servers through web servers 108, 110 connected to electronic network 100. Thus, publishers may be able to distribute electronic content to any other entities in the environment 10 of FIG. 1.

Any of user devices 102, 104, 106, web servers 108, 110 and/or application servers 112 may include any type or combination of computing systems, such as handheld devices, personal computers, servers, clustered computing machines, and/or cloud computing systems. In one embodiment, each of user devices 102, 104, 106, web servers 108, 110, and/or application servers 112 may be an assembly of hardware, including a memory, a central processing unit ("CPU"), and/or optionally a user interface. The memory may include any type of RAM or ROM embodied in a physical storage medium, such as magnetic storage including floppy disk, hard disk, or magnetic tape; semiconductor storage such as solid state disk (SSD) or flash memory; optical disc storage; or magneto-optical disc storage. The CPU may include one or more processors for processing data according to instructions stored in the memory. The functions of the processor may be provided by a single dedicated processor or by a plurality of processors. Moreover, the processor may include, without limitation, digital signal processor (DSP) hardware, or any other hardware capable of executing software. The user interface may include any type or combination of input/output devices, such as a display monitor, touchpad, touchscreen, microphone, camera, keyboard, and/or mouse.

As described above, the presently disclosed systems and methods may be configured to manipulate electronic content, such as text, images, and other HMTL content received over the Internet. In one embodiment, the presently disclosed systems and methods may be configured to horizontally paginate HTML content. FIGS. 2A-2C are schematic diagrams of a technique for horizontally paginating HTML content, according to an exemplary embodiment of the present disclosure. FIG. 2A depicts a schematic simulation of HTML content 202 of unknown length, such as content extending from point A to point N. As shown in FIG. 2A, the content 202 may have an indeterminate, unknown, or even dynamic length. For example, the HTML content may be constantly updated, such as by virtue of an RSS feed or other dynamic process. In addition, the content may contain text, images, and/or any other HTML elements. As shown in FIG. 2A, the content may be substantially longer or taller, than it is wide. In other words, the content may take the form of a portrait or page layout that traditionally would be scrolled through up and down using traditional scrolling elements.

The presently disclosed systems and methods may be configured to manipulate the HTML content of FIG. 2A to become paginated, as shown in FIG. 2C, based on dimensions of a device screen, as shown in FIG. 2B. By way of example, a device screen 204 as shown in FIG. 2B may have any height, H, or width, W, and may be either relatively portrait or landscape oriented. Device screen 204 may be defined based on which device 102, 104, 106 a user is operating. In other words, one of devices 102, 104, 106 may be configured to paginate content, such as HTML content 202 into one or more pages 206 based on the height and width of the device screen. In one embodiment, one or more of devices 102, 104, 106 may be programmed with an operating system or web or mobile browser configured to receive content, such as HTML content 202, and paginate the content into one or more pages 206. In other words, HTML content 202 of length A-N, may be paginated into pages of content from A to B, B to C, and so on, until all of content A-N has been paginated, regardless of its length and even if its length is changing. In one embodiment, pages 206 may have height, H, and width, W, that are set based on the height, H, and width, W, of the device screen 204 of the device 102, 104, 106 that paginates the content 202.

In one embodiment, the presently disclosed systems and methods may be configured to paginate HTML content that is packaged into elements, which are individual components of an HTML document, with each element containing content and having attributes, semantics, and formatting. In addition, the HTML content may be paginated by incorporating a technique of cascading style sheets ("CSS"), which is a language used for describing the look and feel of a document, article, or element written in a markup language, such as HTML. For example, CSS may be used to define document presentation, such as layout, colors, fonts, etc., independent of document content. CSS specifications are maintained by the World Wide Web Consortium (W3C) and change over time.

In one embodiment, the present disclosure describes, among other things, the use of a CSS specification entitled, "CSS Multi-column Layout Module," which is published at "www.w3.org/TR/css3-multicol/", the entire contents of which, as of the filing date of this application, are incorporated herein by reference. The CSS Multi-column Layout Module describes a style sheet language for multi-column layouts for flowing content into multiple columns with a gap and a rule between them. Even though the present disclosure describes, among other things, the use of one or more CSS specifications for modifying web content, it should be appreciated that the present disclosure may be implemented without any CSS specification and/or with any alternative specifications.

Figure 3:
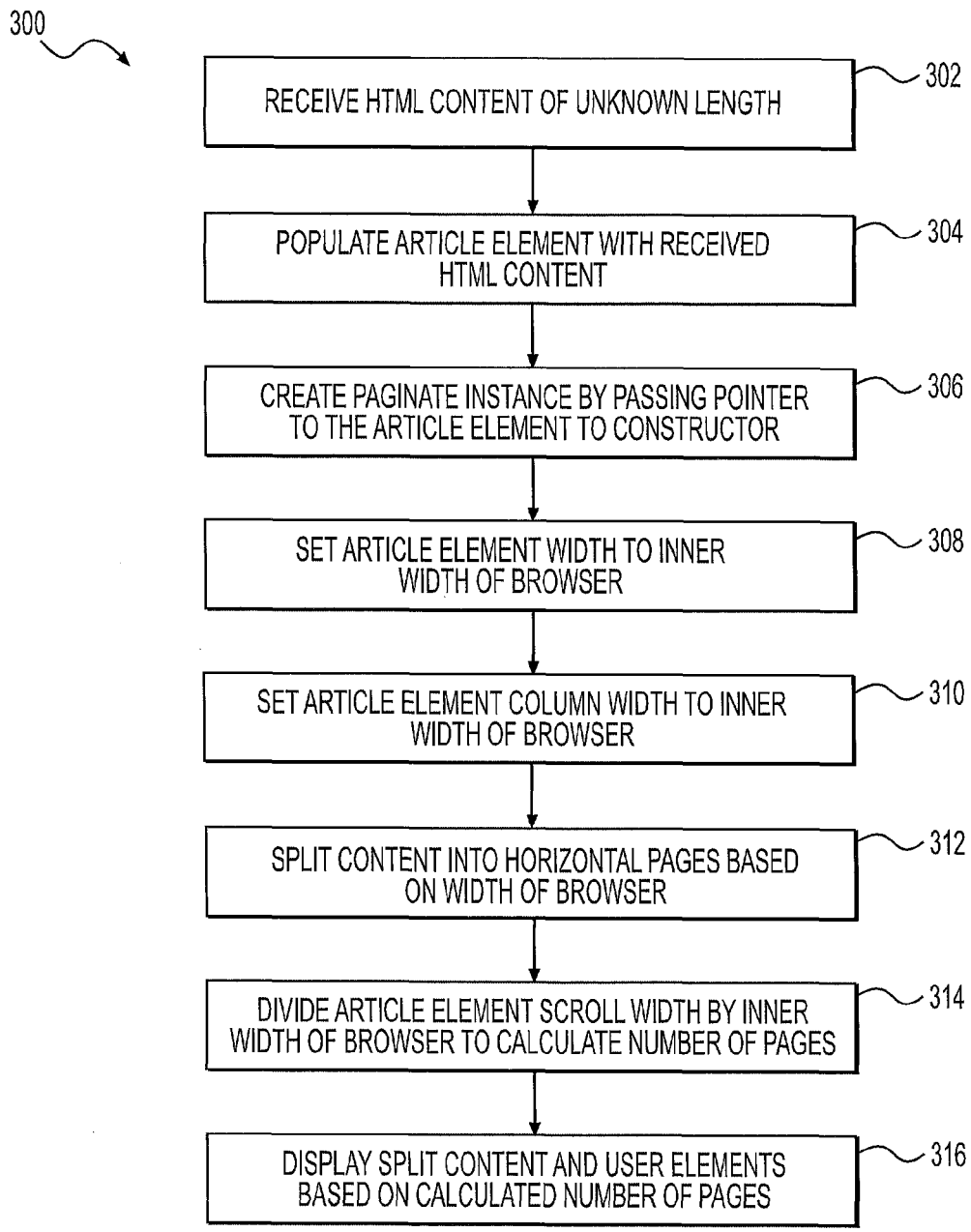
FIG. 3 depicts a flow diagram of a process for horizontally paginating HTML content, according to an exemplary embodiment of the present disclosure.

FIG. 3 depicts a flow diagram of a process for horizontally paginating HTML content, according to an exemplary embodiment of the present disclosure. As described above, one or more of devices 102, 104, 106 may be programmed with an operating system or web or mobile browser configured to receive content, such as HTML content 202, or any other HTML content of unknown length (step 302). For example, one or more of devices 102, 104, 106 may receive content, such as HTML content 202, from one or more of web servers 108, 110 and application server 112, over electronic network 100, such as the Internet. In one embodiment, one of devices 102, 104, 106 may execute an application or mobile application received from or hosted by application server 112, for receiving content from one or more of web servers 108, 110.

Method 300 may further include populating an article element with the received HTML content (step 304). For example, as described above, some or all of the received HTML content may be defined as an element of HTML, such as an article, for which common formatting, layout, etc. may be applied. Method 300 may further include creating a paginate instance by passing a pointer to the populated article element to a constructor (step 306). For example, method 300 may pass a pointer to the populated article element to a JavaScript constructor. Method 300 may further include setting a width of the article element to an inner width of a browser or application of the device (step 308). For example, the width of the article element may be set to the width, W, of the device screen 204 shown in FIG. 2B. In addition, method 300 may include setting a column width of the article element to an inner width of a browser or application of the device (step 310). Again, the column width of the article element may be set to the width, W, of the device screen 204 shown in FIG. 2B.

Method 300 may further including splitting content into horizontal pages based on a width of the browser (step 312). In one embodiment, the HTML content may be split into horizontal pages using the CSS specification for "multi-column layout." However, as discussed above, the content may be split without using the "multi-column layout" specification, without any CSS specification, or with an alternative style sheet language. Method 300 may further include dividing a scroll width of the article element by an inner width of a browser to calculate a number of pages (step 314). In other words, once the content has been split into pages of columns based on the size of the device screen window, it may be desirable to know how many pages were created. For example, when a long and indeterminate vertical element of HTML is automatically split into pages of content having heights matching a device screen's heights, it may be initially unknown how many pages were created. However, because a width of the created content may be determined from a scroll width obtained from a browser, the number of created pages may be calculated by dividing the obtained scroll width by the width of each page (i.e., the inner width of the browser). Method 300 may then include displaying the split or "paginated" content along with one or more user elements based on the calculated number of pages (step 316). For example, in addition to displaying the split or paginated HTML content, the method may include generating a user element that reflects the number of calculated pages and/or which page a user is currently viewing. For example, the method may include displaying which of how many horizontal pages a user is viewing (e.g., 3 of 5, etc.), either using number, text, and/or graphical elements.

Figure 4:
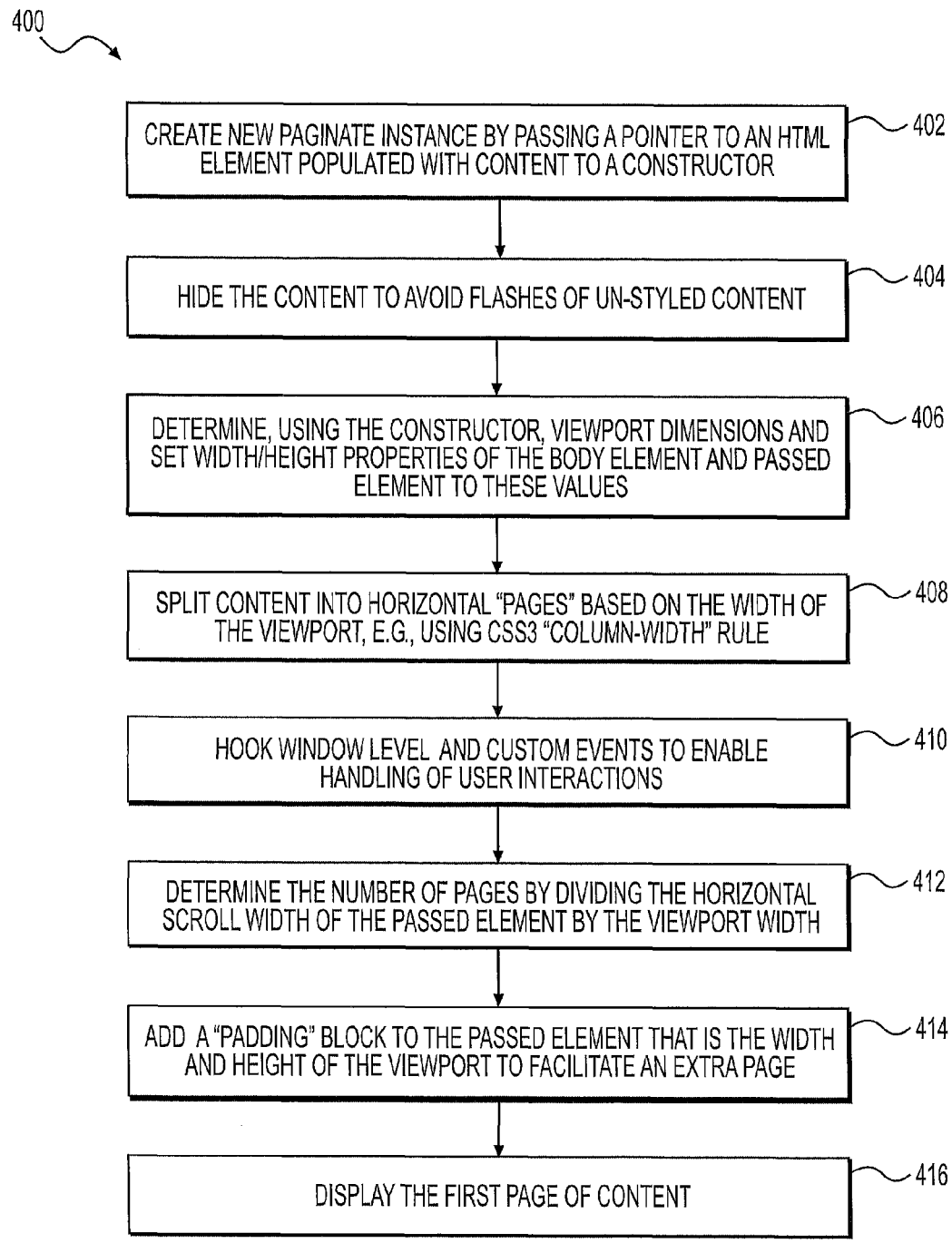
FIG. 4 depicts a flow diagram of another process for horizontally paginating HTML content, according to an exemplary embodiment of the present disclosure.

FIG. 4 depicts a flow diagram of another method 400 for horizontally paginating HTML content, according to an exemplary embodiment of the present disclosure. As with the method 300 of FIG. 3, method 400 may be performed by one or more of devices 102, 104, 106, which may be programmed with an operating system or web or mobile browser configured to receive HTML content of unknown length. For example, one or more of devices 102, 104, 106 may receive content, such as HTML content 202, from one or more of web servers 108, 110 and application server 112, over electronic network 100, such as the Internet. In one embodiment, one of devices 102, 104, 106 may execute an application or mobile application received from or hosted by application server 112, for receiving content from one or more of web servers 108, 110.

Method 400 may include creating a new paginate instance by passing a pointer to an HTML element populated with content to a constructor method (step 402). Method 400 may further include hiding the HTML content to avoid flashes of un-styled content (step 404). Method 400 may further include determining, using the constructor, viewport dimensions associated with a device, and setting width and/or height properties of the body element and passed element to those viewport dimensions (step 406). Method 400 may further include splitting content into horizontal "pages" based on the determined width of the viewport (step 408). For example, in one embodiment, method 400 may include splitting content into horizontal pages using the CSS "column-width" rule, e.g., based on the "multi-column layout" specification. Method 400 may further include hooking window level and custom events to the generated split content to enable handling of user interactions (step 410). In one embodiment, this may provide events enabling a swipe of content pages in a more natural manner. For example, linking window level content may enable the movement of a finger or stylus across, e.g., the glass of a tablet.

Method 400 may further include determining the number of created pages by dividing the horizontal scroll width of the passed element by the determined viewport width (step 412). Method 400 may further include adding a "padding block" to the end of the passed element (step 414). For example, the "padding block" may have the width and height of the viewport and may be configured to simulate an extra page and/or initiate further user action, such as returning to a menu or viewing related content. Method 400 may further include displaying the first page of content (step 416). For example, with reference to the schematic diagram of FIG. 2C, the method may include displaying the page 206 containing the section of content from "A" to "B."

Figure 5A:
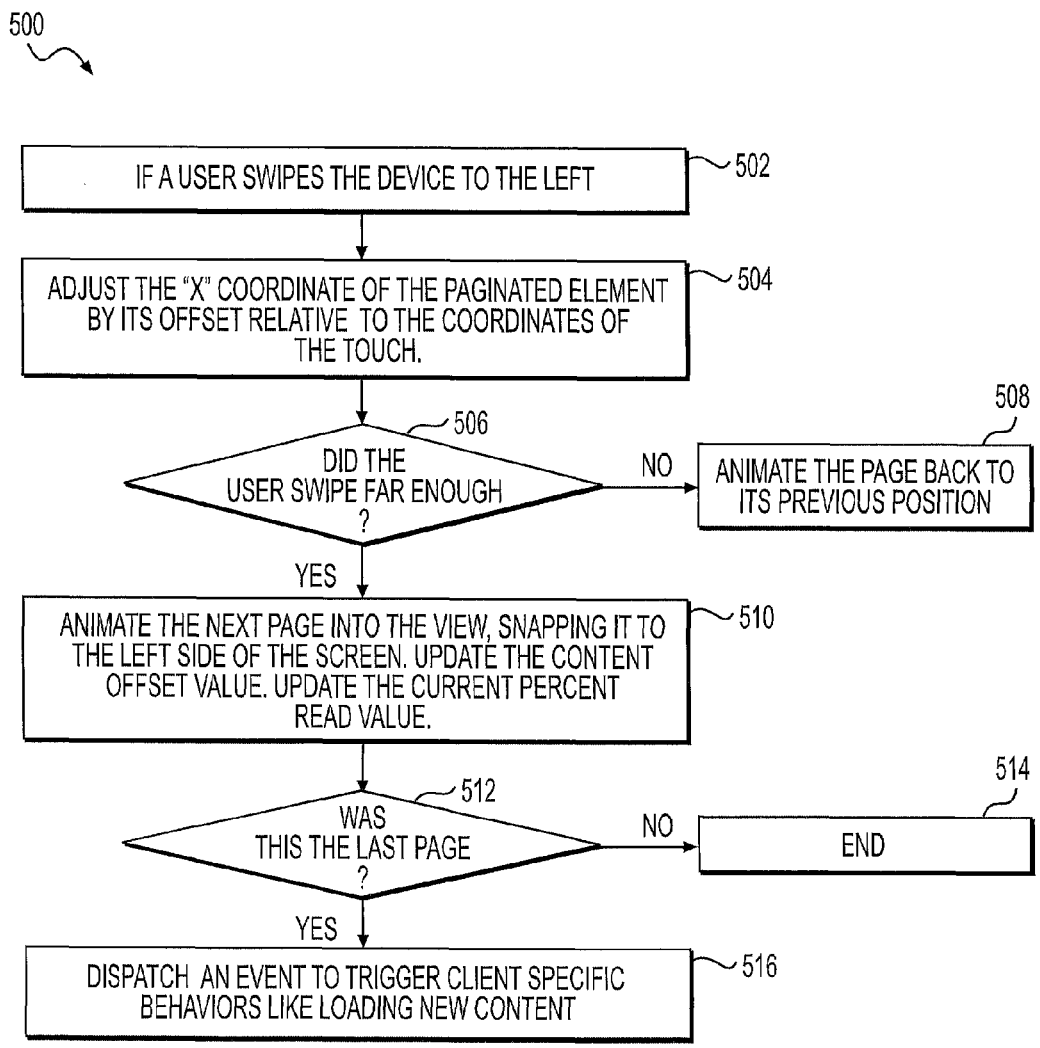
FIGS. 5A-5C depict flow diagrams of processes for enabling user manipulation of horizontally paginated HTML content, according to exemplary embodiments of the present disclosure.
Figure 5B:
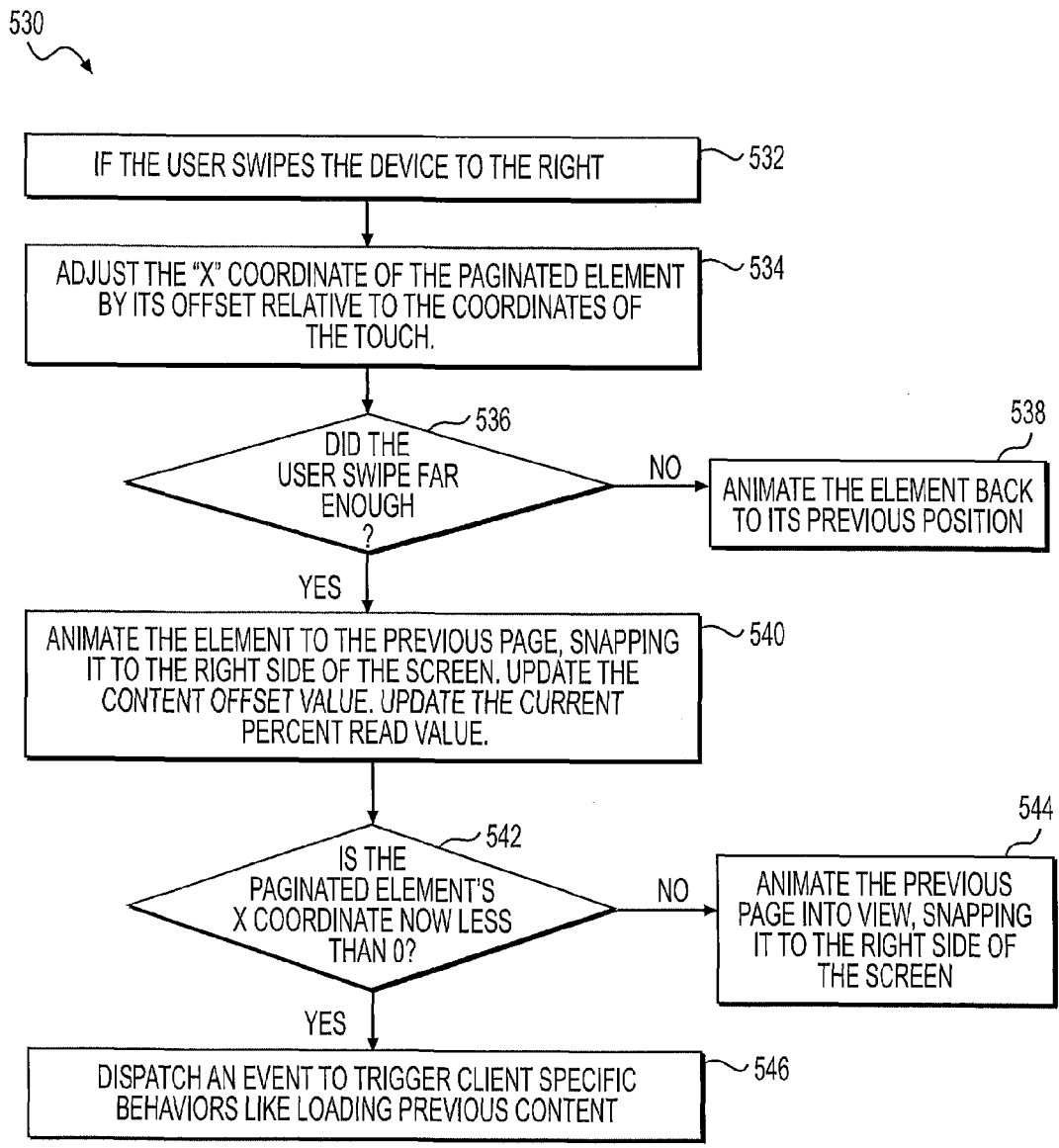
Figure 5C:
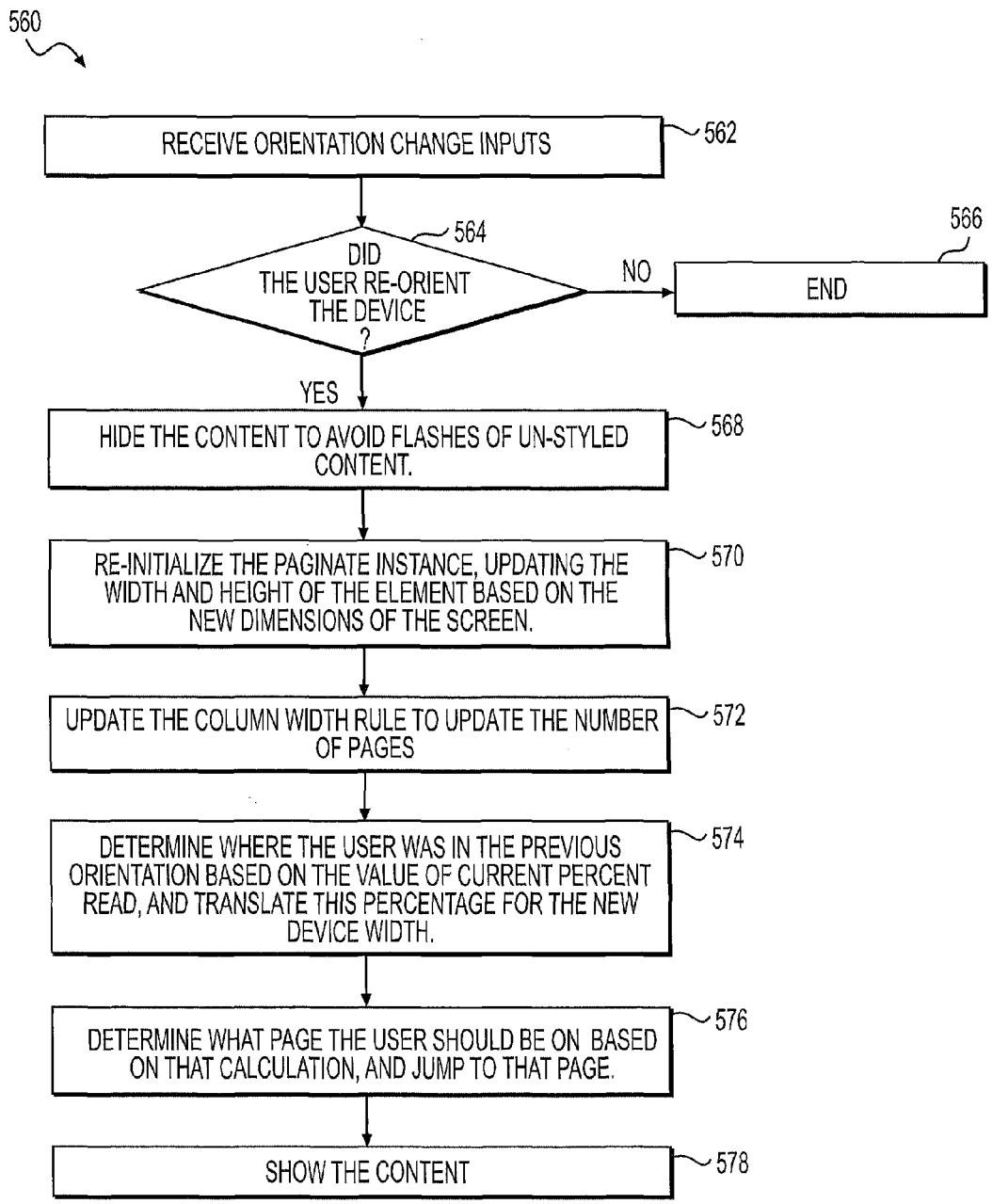

FIGS. 5A-5C depict a flow diagram of a process for enabling user manipulation of horizontally paginated HTML content, according to an exemplary embodiment of the present disclosure. Specifically, FIG. 5A depicts a method 500 for handling user swiping of horizontally paginated HTML content to the left; FIG. 5B depicts a method 530 for handling user swiping of horizontally paginated HTML content to the right; and FIG. 5C depicts a method 560 for handling user changing an orientation of horizontally paginated HTML content.

FIG. 5A depicts a method 500 for handling user swiping of horizontally paginated HTML content to the left. Method 500 may include determining whether a user is swiping a device to the left (step 502) For example, method 500 may include accessing hardware input received through one of devices 102, 104, 106, such as inputs from a touchscreen. Method 500 may further include adjusting an "x" coordinate of the paginated element by its offset relative to the coordinates of the touch (step 504). Method 500 may further include determining whether a user swiped past a predetermined threshold (step 506). If not, method 500 may include animating the page back to its previous position (step 508). If the swipe threshold was met, method 500 may include animating the next page into the view, snapping it to the left side of the screen, updating a content offset value, and updating a current percent read value (step 510). Method 500 may further include determining if the last page was reached (step 512). If not, the method may end at the displayed page (step 514), but if it was the last page, method 500 may include dispatching an event to trigger specific client behaviors, such as loading new content or displaying links to related content (step 516). In one embodiment, client behaviors may include swiping to any sort of media (video, audio, images, etc.) desired to be shown to a user.

FIG. 5B depicts a method 530 for handling user swiping of horizontally paginated HTML content to the right. Method 530 may include determining whether a user is swiping a device to the right (step 532) For example, method 500 may include accessing hardware input received through one of devices 102, 104, 106, such as inputs from a touchscreen. Method 530 may further include adjusting an "x" coordinate of the paginated element by its offset relative to the coordinates of the touch (step 534). Method 530 may further include determining whether a user swiped past a predetermined threshold (step 536). If not, method 530 may include animating the page back to its previous position (step 538). If the swipe threshold was met, method 530 may include animating the previous page into the view, snapping it to the right side of the screen, updating a content offset value, and updating a current percent read value (step 540). Method 530 may further include determining if the paginated element's x-coordinate is now less than 0 (step 542). If not, the method may include animating the previous page into view, snapping it to the right side of the screen (step 544). In one embodiment, a hardware accelerated transform be used to provide a similar effect to the scrolling of the page. If so, method 530 may include dispatching an event to trigger client-specific behaviors, such as loading previous content and/or links to related content (step 546).

FIG. 5C depicts a method 560 for handling user changing an orientation of horizontally paginated HTML content. Method 560 may include receiving orientation change inputs (step 562). If a user re-oriented the device, such as by pressing a button or touch element, and/or rotating or otherwise repositioning the device past a predetermined threshold (step 564), method 560 may proceed to hiding content to avoid flashes of un-styled content (step 568). If the re-orientation threshold was not met, the method may end (step 566) returning to a standby mode for listening for orientation change inputs. Given a reorientation input and completion of step 568, method 560 may further include re-initializing the paginate instance (e.g., created in the methods of FIGS. 3 and/or 4 described above), updating the width and height of the article element based on the new dimensions of the screen (step 570). Method 560 may further include updating the column width rule to update the number of pages (step 572). Method 560 may further include determining where the user was in the previous orientation based on the value of the current percent read, and translating that percentage for the new device width (step 574). Method 560 may further include determining what page the user should be on based on that calculated percentage translation, and jump to that page (step 576) and display content associated with that page (step 578).

Figure 6:
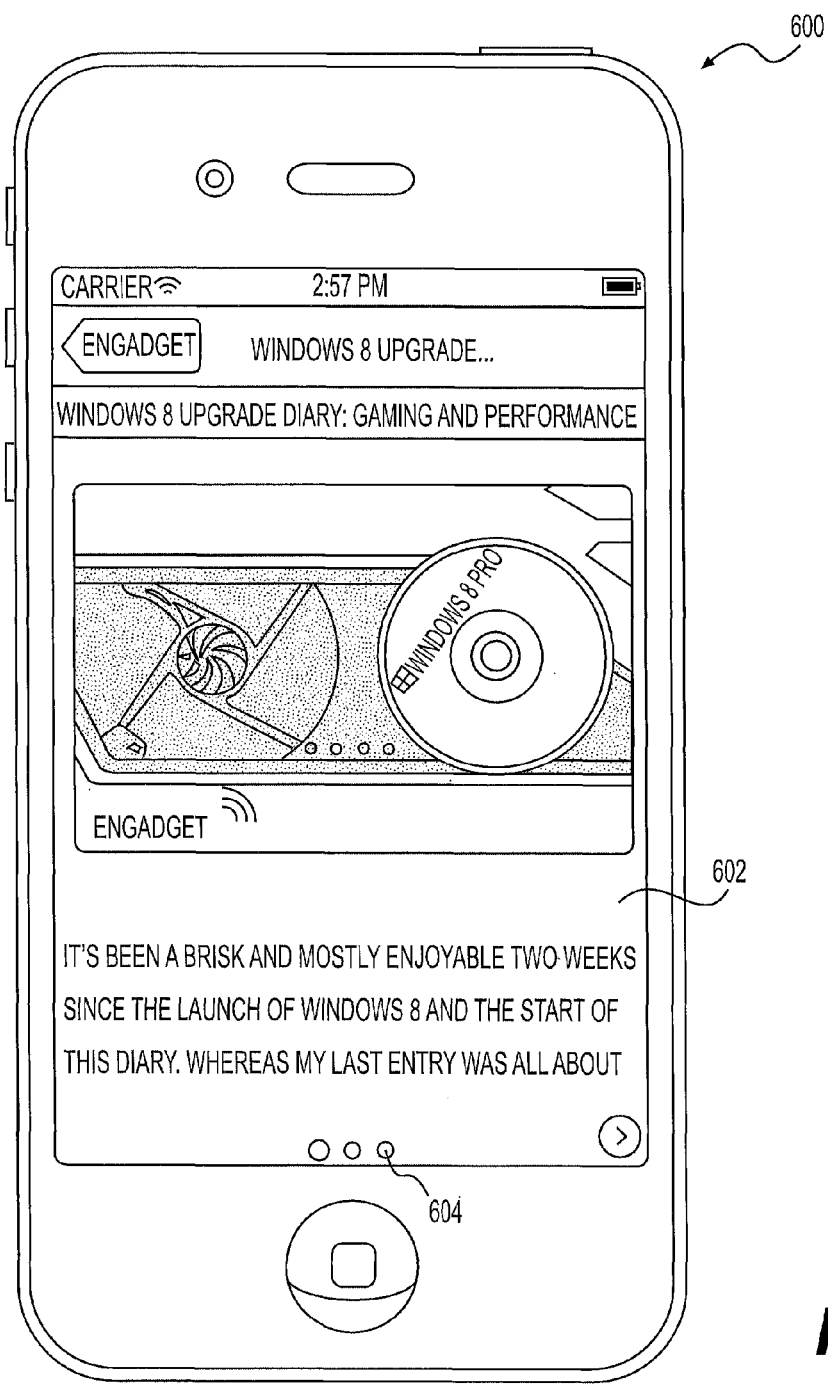
FIG. 6 depicts a schematic diagram of paginated web content displayed in a portrait orientation on a handheld device, according to an exemplary embodiment of the present disclosure.

FIG. 6 depicts a schematic diagram of paginated web content 602 displayed in a portrait orientation on a handheld device 600, according to an exemplary embodiment of the present disclosure. As shown in FIG. 6, the paginated web content 602 may include a pagination navigation element 604 displaying navigation between pages, such as which of the pages is currently displayed.

Figure 7:
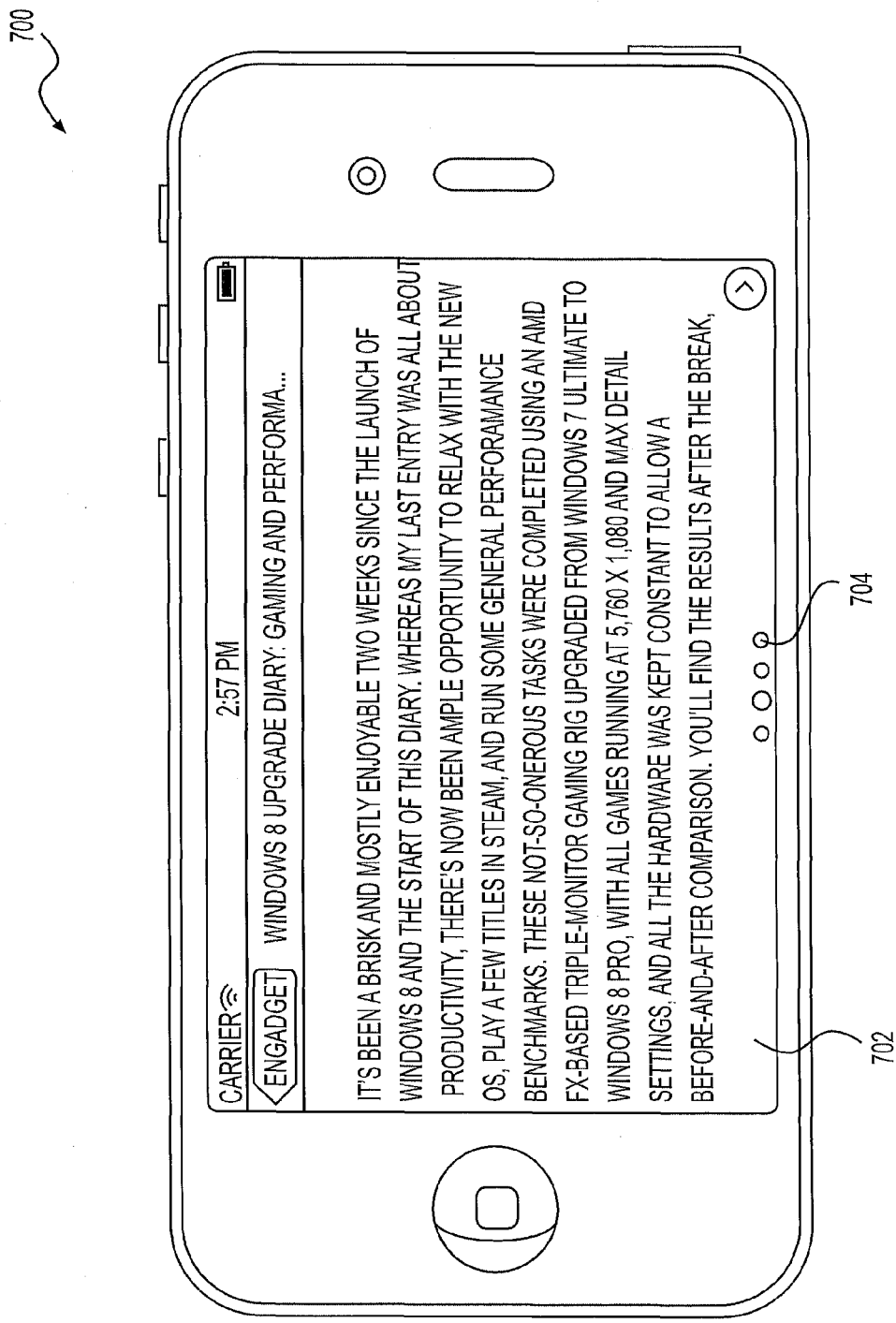
FIG. 7 depicts a schematic diagram of paginated web content displayed in a landscape orientation on a handheld device, according to an exemplary embodiment of the present disclosure.

FIG. 7 depicts a schematic diagram of paginated web content 702 displayed in a landscape orientation on a handheld device 700, according to an exemplary embodiment of the present disclosure. As shown in FIG. 7, the paginated web content 702 may include a pagination navigation element 704 displaying navigation between pages, such as which of the pages is currently displayed.

Figure 8:
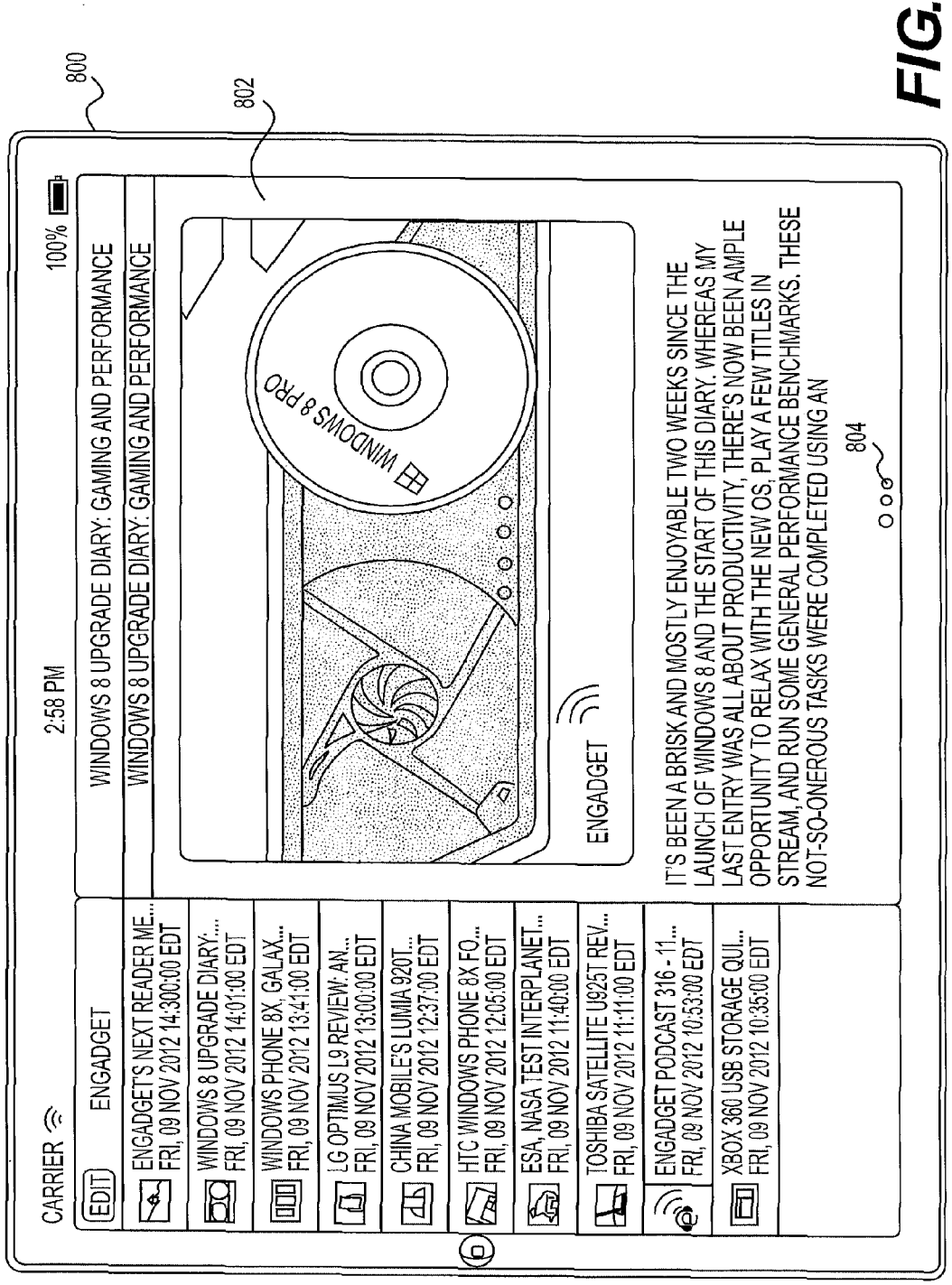
FIG. 8 depicts a schematic diagram of paginated web content displayed in a landscape orientation on a tablet device, according to an exemplary embodiment of the present disclosure.

FIG. 8 depicts a schematic diagram of paginated web content 802 displayed in a landscape orientation on a tablet device 800, according to an exemplary embodiment of the present disclosure. As shown in FIG. 8, the paginated web content 802 may include a pagination navigation element 804 displaying navigation between pages, such as which of the pages is currently displayed.

Figure 9:
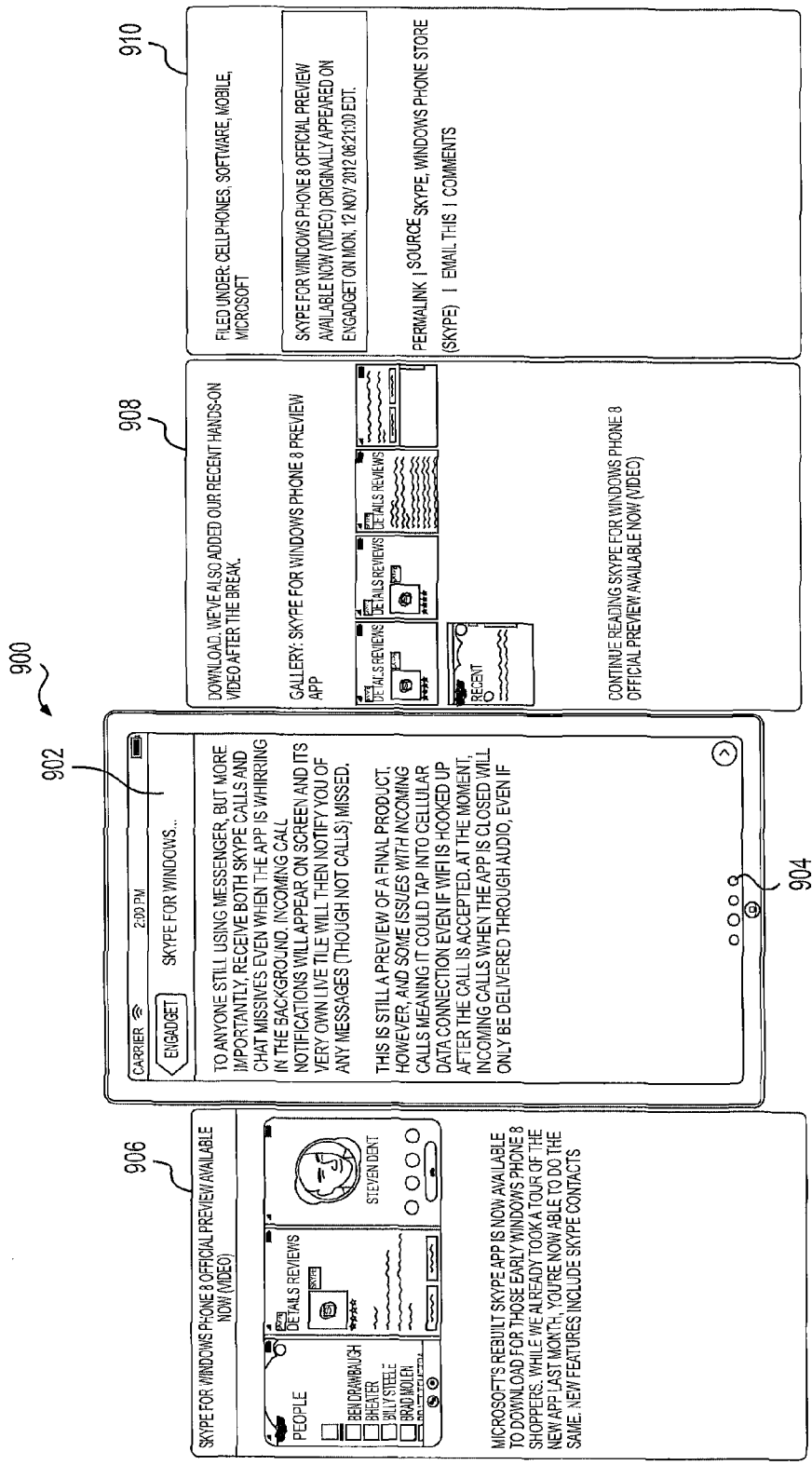
FIG. 9 depicts a schematic diagram of paginated web content simulated as queued up for display on a tablet device, according to an exemplary embodiment of the present disclosure.

FIG. 9 depicts a schematic diagram of paginated web content 902 simulated as queued up for display on a tablet device 900, according to an exemplary embodiment of the present disclosure. As shown in FIG. 9, HTML content may be split into pages that are oriented in a horizontal row and queued for display on the device 900. For example, the pages may be lined up and oriented as side-by-side images that are sequentially displayed and advanced across the device screen. For example, as shown in FIG. 9, while content 902 is displayed on the device 900, content of page 906 (presumably already viewed) is to the left, and can be viewed by scrolling, swiping, or otherwise gesturing for that page. Likewise, content of pages 908 and 910 (presumably not yet viewed) is to the right, and can be viewed by scrolling, swiping, or otherwise gesturing for that page.

The presently disclosed systems and methods enable such valuable user interactions and content display even when an amount of HTML content is unknown, indeterminate, difficult to determine, and/or dynamic. That is, unlike past systems and methods requiring wrapping of all content within an element and manual division into different pages, the disclosed embodiments automatically split content into multiple columns. and therefore pages, independent of the amount of content present and therefore pages created. As a result, the presently disclosed systems and methods provide a powerful and valuable tool for displaying content in a world in which dynamic content is increasingly distributed on devices that people value interacting with according to the techniques of FIGS. 6-9.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for horizontally paginating HTML content, the method including:
   receiving, at a web browser of a device and over a network, HTML content of dynamic length that is updated to include new HTML content;
   creating an article element that includes the received HTML content;
   setting a width of the article element to a width of the web browser;
   setting a height of the article element to a height of the web browser;
   setting a column width of the article element to the width of the web browser;
   splitting the HTML content into a plurality of pages based on the width of the web browser and the height of the web browser;
   generating a padding block of HTML content having a width equal to the width of the article element, having a height equal to the height of the article element, and having content to enable a user to return to a menu,
   appending the padding block of HTML content to the end of the HTML content to appear as an additional page;
   calculating a number of the plurality of pages based on a scroll width of the article element and the width of the web browser; and
   displaying a user element and one of the plurality pages in the web browser, the user element being based on the calculated number of the plurality of pages.

2. The method of claim 1, wherein the number of the plurality of pages is calculated by dividing the scroll width of the article element by the width of the web browser.

3. The method of claim 1, further comprising:
   creating a new paginate instance by passing a pointer to the article element to a constructor; and
   using the constructor, determining a height and width of the web browser.

4. The method of claim 3, further comprising setting a height and width of the article element to the determined height and width of the web browser.

5. The method of claim 1, wherein the HTML content is split into the plurality of pages based on the width of the web browser by using a cascading style sheet function.

6. The method of claim 5, wherein the cascading style sheet function is a function for generating columns of text.

7. The method of claim 1, further comprising hooking window level and custom events to enable handling of user interactions.

8. The method of claim 7, further comprising modifying a display of the at least one of the plurality of pages based on a received user gesture to the left, user gesture to the right, or reorientation of the device.

9. The method of claim 1, further comprising hiding the received HTML content before splitting the received HTML content.

10. A device for horizontally paginating HTML content, the device including:
- a data storage device storing instructions for horizontally paginating HTML content;
- a processor configured to execute the instructions to perform a method including:
  - receiving, at a web browser of a device and over a network, HTML content of dynamic length that is updated to include new HTML content;
  - creating an article element that includes the received HTML content;
  - setting a width of the article element to a width of the web browser;
  - setting a height of the article element to a height of the web browser;
  - setting a column width of the article element to the width of the web browser;
  - splitting the HTML content into a plurality of pages based on the width of the web browser and the height of the web browser;
  - generating a padding block of HTML content having a width equal to the width of the article element, having a height equal to the height of the article element, and having content to enable a user to return to a menu,
  - appending the padding block of HTML content to the end of the HTML content to appear as an additional page;
  - calculating a number of the plurality of pages based on a scroll width of the article element and the width of the web browser; and
  - displaying a user element and one of the plurality pages in the web browser, the user element being based on the calculated number of the plurality of pages.

11. The device of claim 10, wherein the number of the plurality of pages is calculated by dividing the scroll width of the article element by the width of the web browser.

12. The device of claim 10, further comprising:
- creating a new paginate instance by passing a pointer to the article element to a constructor; and
- using the constructor, determining a height and width of the web browser.

13. The device of claim 12, further comprising setting a height and width of the article element to the determined height and width of the web browser.

14. The device of claim 10, wherein the HTML content is split into a plurality of pages based on the width of the web browser by using a cascading style sheet function.

15. The device of claim 14, wherein the cascading style sheet function is a function for generating columns of text.

16. The device of claim 10, further comprising hooking window level and custom events to enable handling of user interactions.

17. The device of claim 16, further comprising modifying a display of the at least one of the plurality pages based on a received user gesture to the left, user gesture to the right, or reorientation of the device.

18. The device of claim 10, further comprising hiding the received HTML content before splitting the received HTML content.

19. A non-transitory computer-readable medium storing instructions that, when executed by a computer, cause the computer to perform a method of horizontally paginating HTML content, the method including:
- creating an article element that includes HTML content received at a web browser of a device and over a network, the HTML content of dynamic length that is updated to include new HTML content;
- setting a width of the article element to a width of the web browser;
- setting a height of the article element to a height of the web browser;
- setting a column width of the article element to the width of the web browser;
- splitting the HTML content into a plurality of pages based on the width of the web browser and the height of the web browser;
- generating a padding block of HTML content having a width equal to the width of the article element, having a height equal to the height of the article element, and having content to enable a user to return to a menu,
- appending the padding block of HTML content to the end of the HTML content to appear as an additional page and initiate a user action, the user action being one of returning to a menu or viewing additional content;
- calculating a number of the plurality of pages based on a scroll width of the article element and the width of the web browser; and
- generating a display of a user element and one of the plurality of pages in the web browser, the user element being based on the calculated number of the plurality of pages.

* * * * *